United States Patent
Chai

(10) Patent No.: US 7,968,659 B2
(45) Date of Patent: Jun. 28, 2011

(54) COPOLYMERS AND FILMS THEREOF

(75) Inventor: Choon Kooi Chai, Overijse (BE)

(73) Assignee: Ineos Europe Limited, Hampshire (GB)

( * ) Notice: Subject to any disclaimer, the term of this patent is extended or adjusted under 35 U.S.C. 154(b) by 728 days.

(21) Appl. No.: 11/883,162

(22) PCT Filed: Jan. 27, 2006

(86) PCT No.: PCT/GB2006/000276
§ 371 (c)(1),
(2), (4) Date: Sep. 20, 2007

(87) PCT Pub. No.: WO2006/085051
PCT Pub. Date: Aug. 17, 2006

(65) Prior Publication Data
US 2008/0249262 A1 Oct. 9, 2008

(30) Foreign Application Priority Data

Feb. 9, 2005 (EP) ..................................... 05250736

(51) Int. Cl.
*C08F 210/16* (2006.01)
*C08F 4/6592* (2006.01)
(52) U.S. Cl. ..................... 526/160; 526/348.5; 526/161; 526/170; 526/172; 526/348
(58) Field of Classification Search .................. 526/160, 526/170, 161, 172, 348, 348.1, 348.5
See application file for complete search history.

(56) References Cited

U.S. PATENT DOCUMENTS

| | | | |
|---|---|---|---|
| 6,204,335 B1 * | 3/2001 | Somers | 525/240 |
| 6,300,437 B1 | 10/2001 | Howard et al. | |
| 6,462,161 B1 | 10/2002 | Cady et al. | |
| 6,642,339 B1 | 11/2003 | Chai et al. | |
| 2002/0058828 A1 * | 5/2002 | Crowther et al. | 556/11 |
| 2002/0143123 A1 * | 10/2002 | Dekmezian et al. | 526/119 |
| 2005/0192417 A1 * | 9/2005 | Iseki et al. | 526/72 |

FOREIGN PATENT DOCUMENTS

| | | |
|---|---|---|
| EP | 1 134 238 A1 | 9/2001 |
| EP | 1 312 625 A1 | 5/2003 |
| EP | 1 443 062 A2 | 8/2004 |
| EP | 1 443 062 A3 | 8/2004 |
| WO | WO 93/08231 | 4/1993 |
| WO | WO 03/046025 * | 6/2003 |
| WO | WO 2005/019333 A1 | 3/2005 |

OTHER PUBLICATIONS

Vega et al., Macromol. Chem. Phys. 200 (1999) 2257-2268.*
International Preliminary Report on Patentability; PCT International Application No. PCT/GB2006/000276; International Filing Date Jan. 27, 2006 (5 pgs).

* cited by examiner

*Primary Examiner* — Roberto Rabago
(74) *Attorney, Agent, or Firm* — Nixon & Vanderhye

(57) ABSTRACT

Copolymers of ethylene and an alpha-olefin having (a) a density in the range 0.900-0.940 g/cm$^3$, (b) a molecular weight distribution (Mw/Mn) in the range 3.5 to 4.5, (c) a melt elastic modulus G' (G"=500 Pa) in the range 40 to 150 Pa, (d) an activation energy of flow (Ea) in the range 28-45 kJ/mol, and (e) a melt index (g/10 ml) in the range 1.0-3.5. The copolymers are suitably prepared in the gas phase by use of a supported metallocene catalyst system. The copolymers show improved processability and are particular suitable for use in blown film applications.

13 Claims, No Drawings

COPOLYMERS AND FILMS THEREOF

This application is the U.S. National Phase of International Application PCT/GB2006/000276, filed 27 Jan. 2006, which designated the U.S. PCT/GB2006/000276 claims priority to European Application No. 05250736.5 filed 9 Feb. 2005. The entire content of these applications are incorporated herein by reference.

The present invention relates to novel copolymers and in particular to novel copolymers of ethylene and alpha-olefins in particular to linear low density polyethylenes (LLDPE) and also to films produced from said copolymers.

In recent years there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD).

Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

Recently a number of patents have published directed to the preparation of films based on low density polyethylenes prepared using metallocene catalyst compositions.

WO 94/14855 discloses linear low density polyethylene (LLDPE) films prepared using a metallocene, alumoxane and a carrier. The metallocene component is typically a bis(cyclopentadienyl) zirconium complex exemplified by bis(n-butylcyclopentadienyl) zirconium dichloride and is used together with methyl alumoxane supported on silica. The LLDPE's are described in the patent as having a narrow Mw/Mn of 2.5-3.0, a melt flow ratio (MFR) of 15-25 and low zirconium residues.

WO 94/26816 also discloses films prepared from ethylene copolymers having a narrow composition distribution. The copolymers are also prepared from traditional metallocenes (eg bis(1-methyl, 3-n-butylcyclopentadienyl) zirconium dichloride and methylalumoxane deposited on silica) and are also characterised in the patent as having a narrow Mw/Mn values typically in the range 3-4 and in addition by a value of Mz/Mw of less than 2.0.

However, it is recognised that the polymers produced from these types of catalyst system have deficiencies in processability due to their narrow Mw/Mn. Various approaches have been proposed in order to overcome this deficiency. An effective method to regain processability in polymers of narrow Mw/Mn is by the use of certain catalysts which have the ability to incorporate long chain branching (LCB) into the polymer molecular structure. Such catalysts have been well described in the literature, illustrative examples being given in WO 93/08221 and EP-A-676421.

Furthermore, WO 97/44371 discloses polymers and films where long chain branching is present, and the products have a particularly advantageous placement of the comonomer within the polymer structure. Polymers are exemplified having both narrow and broad Mw/Mn, for example from 2.19 up to 6.0, and activation energy of flow, which is an indicator of LCB, from 7.39 to 19.2 kcal/mol (31.1 to 80.8 kJ/mol). However, there are no examples of polymers of narrow Mw/Mn, for example less than 3.4, which also have a low or moderate amount of LCB, as indicated by an activation energy of flow less than 11.1 kcal/mol (46.7 kJ/mol).

Our earlier application WO 00/68285 exemplified copolymers of ethylene and alpha-olefins having molecular weight distributions in the range 2.3 to 3.2, melt index of 1.02-1.57 and activation energies of about 32. The copolymers were most suitable for use in the application of films showing good processability, improved optical and mechanical properties and good heat sealing properties. The copolymers were suitably prepared in the gas phase by use of monocyclopentadienyl metallocene complexes.

We have now found that it is possible to prepare copolymers of ethylene and alpha-olefins having broader molecular weight distributions (Mw/Mn) and low or moderate amounts of LCB These copolymers are suitable for many applications which will be known to those skilled in the art, but in particular are advantageous for preparing films with an excellent balance of processing, optical and mechanical properties.

Thus according to a first aspect of the present invention there is provided a copolymer of ethylene and an alpha-olefin, said copolymer having
(a) a density in the range 0.900-0.940 g/cm$^3$,
(b) a molecular weight distribution (Mw/Mn) in the range 3.5 to 4.5,
(c) a melt elastic modulus G' (G"=500 Pa) in the range 40 to 150 Pa, and
(d) an activation energy of flow (Ea) in the range 28-45 kJ/mol.

Preferred copolymers are those having
(a) a density in the range 0.900-0.940 g/cm$^3$,
(b) a molecular weight distribution (Mw/Mn) in the range 3.6-4.0
(c) a melt elastic modulus G' (G"=500 Pa) in the range 45 to 100 Pa and
(d) an activation energy of flow (Ea) from 28 to 45 kJ/mol.

Particularly preferred copolymers are those having a a melt elastic modulus G' (G"=500 Pa) in the range 50 to 100 Pa.

The copolymers of the present invention exhibit a melt index (g/10 ml) in the range 0.1 to 6.0, preferably in the range 1.0 to 3.5 and most preferably in the range 1.2-1.6.

The novel copolymers of the present invention preferably show a relationship between melt index and melt elastic modulus G' according to the equation:

$$G'(G''=500\ Pa) > 58-8\ MI \text{ for melt index less} < 6.$$

Thus according to another aspect of the present invention there is provided a copolymer of ethylene and an alpha-olefin, said copolymer having
(a) a density in the range 0.900-0.940 g/cm$^3$,
(b) a molecular weight distribution (Mw/Mn) in the range 3.5 to 4.5, and
(c) a relationship between melt elastic modulus G'G' (G"=500 Pa) and melt index (MI) satisfying the equation:

$$G'(G''=500\ Pa) > 58-8\ MI \text{ for melt index less} < 6.$$

The novel copolymers of the present invention contain a small amount of long chain branching which may be demonstrated by a value of the long chain branching parameter g' of <1.0. The parameter g' may suitably be calculated from gel permeation chromatography (GPC) on-line viscometry data. Details of the long chain branching parameter g' may be found in our earlier publication EP 1045868 the relevant parts of which are incorporated herein by reference.

Preferred alpha-olefins are those having C4-C12 carbon atoms. Most preferred alpha-olefins are 1-butene, 1-hexene, 4-methyl-1-pentene and 1-octene.

The preferred alpha-olefin is 1-hexene.

The copolymers of the present invention may suitably be prepared by use of a metallocene catalyst system comprising, preferably a monocyclopentadienyl metallocene complex having a 'constrained geometry' configuration together with a suitable activator.

Examples of monocyclopentadienyl or substituted monocyclopentadienyl complexes suitable for use in the present invention are described in EP 416815, EP 418044, EP 420-436 and EP 551277.

Suitable complexes may be represented by the general formula:

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

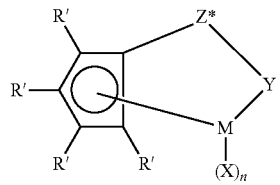

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamino) dimethyl (tetramethyl-$\eta^5$-cyclopentadienyl) silanetitanium dichloride.

Particularly preferred metallocene complexes for use in the preparation of the copolymers of the present invention may be represented by the general formula:

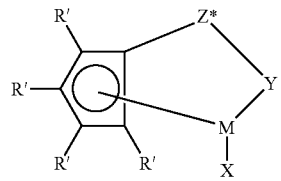

wherein:—

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—,

M is titanium or zirconium in the +2 formal oxidation state;

Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a $\pi$-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane- or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-$\eta^5$-cyclopentadienyl) dimethyl silanetitanium-$\eta^4$-1,3-pentadiene.

Suitable cocatalysts for use in the preparation of the novel copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminum compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

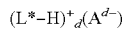

$(L^*-H)^+_d (A^{d-})$ wherein:—
L* is a neutral Lewis base
$(L^*-H)^+_d$ is a Bronsted acid
$A^{d-}$ is a non-coordinating compatible anion having a charge of d⁻, and
d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl) borate,
triethylammonium tetrakis(pentafluorophenyl) borate,
tripropylammonium tetrakis(pentafluorophenyl) borate,
tri(n-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl) borate
tri (p-tolyl)(hydroxyphenyl) borate
tris (pentafluorophenyl)(hydroxyphenyl) borate
tris (pentafluorophenyl)(4-hydroxyphenyl) borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl)methylammonium and similar.

Particular preferred cocatalysts of this type are alkylammonium tris(pentafluorophenyl) 4-(hydroxyphenyl) borates.

A particularly preferred cocatalyst is bis(hydrogenated tallow alkyl)methyl ammonium tris (pentafluorophenyl) (4-hydroxyphenyl) borate.

With respect to this type of cocatalyst, a preferred compound is the reaction product of an alkylammonium tris(pentafluorophenyl)-4-(hydroxyphenyl) borate and an organometallic compound, for example triethylaluminium or an aluminoxane such as tetraisobutylaluminoxane.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica. Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminium compound and most preferably a trialkylaluminum compound in a dilute solvent.

The support material is pretreated with the organometallic compound at a temperature of −20° C. to 150° C. and preferably at 20° C. to 100° C.

Particularly suitable catalysts for use in the preparation of the copolymer of the present invention are metallocene complexes which have been treated with polymerisable monomers. Our earlier applications WO 04/020487 and WO 05/019275 describe supported catalyst compositions wherein a polymerisable monomer is used in the catalyst preparation.

Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene/1-hexene.

The preferred polymerisable monomer is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The novel copolymers of the present invention may suitably be prepared in processes performed in either the slurry or the gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

The novel copolymers are most suitably prepared in a gas phase process.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process.

The novel copolymers of the present invention may be suitably prepared by the copolymerisation of ethylene with alpha-olefins.

The preferred alpha-olefins are 1-butene, 1-hexene, 4-methyl-1-pentene and 1-octene. The most preferred alpha-olefin is 1-hexene.

Thus according to another aspect of the present invention there is provided a method for the preparation of copolymers of ethylene and alpha-olefins having (a) a density in the range 0.900-0.940 g/cm$^3$,
(b) a molecular weight distribution (Mw/Mn) in the range 3.5 to 4.5,
(c) a melt elastic modulus G' (G"=500 Pa) in the range 40 to 150 Pa, and
(d) an activation energy of flow (Ea) in the range 28-45 kJ/mol.

said method comprising copolymerising ethylene and said alpha olefins in the presence of a catalyst system as hereinbefore described.

The novel copolymers are particularly suitable for the production of films and sheets prepared using traditional methods well known in the art. Examples of such methods are film blowing, film casting and orientation of the partially crystallised product. The films exhibit good processability, improved optical and mechanical properties and good heat sealing properties.

The films exhibit excellent dart impact as well as low haze and high gloss.

The films typically exhibit a haze ranging from 3 to 20 and a dart impact (25 μm film)>500 g, preferably >1000 g and most preferably >2000 g.

The films exhibit excellent dart impact as well as low haze and high gloss.

The films exhibit a haze of <10% and preferably of <7%.
The films exhibit a gloss of >60% and preferably >65%.

The films may be suitable for a number of applications for example industrial, retail, food packaging, non-food packaging and medical applications. Examples include films for bags, garment bags, grocery sacks, merchandise bags, self-serve bags, grocery wet pack, food wrap, pallet stretch wrap, bundling and overwrap, industrial liners, refuse sacks, heavy duty bags, agricultural films, diaper liners, etc.

The films may be utilised as shrink film, cling film, stretch film, sealing film or other suitable type.

The novel copolymers of the present invention are particularly suitable for use in the manufacture of blown films.

Thus according to another aspect of the present invention there is provided a film comprising a copolymer of ethylene and an alpha-olefin having (a) a density in the range 0.900-0.940 g/cm$^3$
(b) a molecular weight distribution (Mw/Mn) in the range 3.5 to 4.5,
(c) a melt elastic modulus G' (G"=500 Pa) in the range 40 to 150 Pa, and
(d) an activation energy of flow (Ea) in the range 28-45 kJ/mol.

Particularly preferred films are those a dart impact (25 μm film)>1000 g, a haze <10% and a gloss of >65%, said film comprising a copolymer of ethylene and an alpha-olefin having (a) a density in the range 0.900-0.940 g/cm$^3$
(b) a molecular weight distribution (Mw/Mn) in the range 3.5 to 4.5,
(c) a melt elastic modulus G' (G"=500 Pa) in the range 40 to 150 Pa, and
(d) an activation energy of flow (Ea) in the range 28-45 kJ/mol.

The present invention will now be further illustrated with reference to the following examples:

EXAMPLE 1

Treatment of Silica with Triethylaluminium (TEA)

Under continuous agitation, 1491 L of isohexane and 397 kg of silica D948 (available from W.R. Grace), were added to a reactor. (The silica had been previously calcined under nitrogen to reach a level of hydroxyl groups of 1.53 mmol/g). 19.3 kg of an octastat 2000 (available from Octel) solution in pentane (2 g/l) was the added and the mixture was stirred for 15 minutes. 571 kg of a 12% triethylaluminium (TEA) solution in isohexane was then slowly added over 1 hour and the mixture was stirred for 1 hour further at 30° C. The slurry was filtered and thoroughly washed with isohexane before being transferred to a dryer. 19 kg of an octastat 2000 solution in pentane (2 g/l) was added and the mixture was finally dried at 60° C. under vacuum.

428 kg of silica/TEA were obtained. The aluminium content of the solid was found to be 1.3 mmol/g.

Preparation of Catalyst Component 1

To 216.9 kg of a 9.58% solution of [N(H)Me(C$_{18-22}$H$_{37-45}$)$_2$][B(C$_6$F$_5$)$_3$(p-OHC$_6$H$_4$)] in toluene were added over 15 minutes 17.749 kg of 11.72% TEA solution in isohexane. The mixture was further stirred for 15 minutes to yield a solution of catalyst component 1

Preparation of a Mixture of (C$_5$Me$_4$SiMe$_2$N$^t$Bu)Ti(η$^4$-1,3-pentadiene) with 1-hexene To 52.992 kg of a 11.64% solution of (C$_5$Me$_4$SiMe$_2$N$^t$Bu)Ti(η$^4$-1,3-pentadiene) in heptane were added 47.81 kg of 1-hexene.

Preparation of the Supported Catalyst 288 kg of the above prepared silica/TEA was introduced into a reactor. The above prepared solution of catalyst component 1 was fed to the reactor over 45 minutes and the mixture was then stirred for further 30 minutes. The contents of the reactor were then cooled to 15° C. and the above prepared solution of (C$_5$Me$_4$SiMe$_2$N$^t$Bu)Ti(η$^4$-1,3-pentadiene) and 1-hexene was fed over a period of 30 minutes, and then the mixture was further stirred for 1 hour. During the addition the internal temperature increased to a maximum of 23° C. 34 kg of an octastat 2000 solution in pentane (2 g/l) was then added and the mixture was dried at 45° C. until the residual solvent content in the catalyst was <1%. Analysis of the resulting dry powder showed the titanium content to be 44.0 μmol/g, the boron content to be 53.7 μmol/g and the aluminium content to be 1.02 mmol/g.

Polymerisation

A reactor of 5 m diameter, 16 m cylindrical height used for polyethylene production in gas phase was purged with N2. 50 liters TiBA were added to lower impurities in the reactor and associated gas loop equipment.

A 100-ton metallocene seed bed was added to the reactor. The bed was N2 purged at 86° C., and 30 more liters TIBA were added to further reduce impurities in the reactor and gas loop. Once the reactor and gas loop were under N2 pressure, the gas phase composition was started until reaching a partial pressure of 1.5 bar.

The gas phase composition was completed by adding ethylene, hexene-1 and hydrogen until reaching the total operating pressure of 19 barg.

A continuous flow of the above supported catalyst was added to the reactor and the gas phase composition controlled to the following parameters, as polymer powder was being produced, withdrawn from the reactor and separated from residual hydrocarbons.

Partial pressure of ethylene: 11 to 13.5 bars

Hexene-1 to ethylene partial pressure ratio: 0.006 to 0.007

Hydrogen to ethylene partial pressure ratio: 0.0025 to 0.0030

The reactor overhead temperature was controlled at 80° C. and polymer continuously removed from the reactor.

Copolymers of ethylene and 1-hexene were prepared and analysed with the properties shown in Table 1.

A relative calibration was constructed using 13 narrow molecular weight linear polystyrene standards:

| PS Standard | Molecular Weight |
| --- | --- |
| 1 | 7520000 |
| 2 | 4290000 |
| 3 | 2630000 |
| 4 | 1270000 |
| 5 | 706000 |
| 6 | 355000 |
| 7 | 190000 |
| 8 | 114000 |
| 9 | 43700 |
| 10 | 18600 |
| 11 | 10900 |
| 12 | 6520 |
| 13 | 2950 |

The elution volume, V, was recorded for each PS standards. The PS molecular weight was then converted to PE equivalent using the following Mark Houwink parameters $k_{ps}=1.21\times 10^{-4}$, $\alpha_{ps}=0.707$, $k_{pe}=3.92\times10^{-4}$, $\alpha_{pe}=0.725$. The calibration curve $Mw_{PE}=f(V)$ was then fitted with a first order linear equation. All the calculations are done with Millennium 3.2 software from Waters.

The very low molecular weight fractions (below 1000 Daltons) were routinely excluded in the calculation of number average molecular weight, Mn, and hence the polymer polydispersity, Mw/Mn, in order to improve integration at the low

TABLE 1

| Property | Ex. 1 | Ex. 2 | Ex. 3 | Ex. 4 | Ex. 5 | Ex. 6 |
| --- | --- | --- | --- | --- | --- | --- |
| Density (g/cm$^3$) | 0.919 | 0.9194 | 0.9191 | 0.9181 | 0.9187 | 0.9184 |
| Melt Index (g/10 ml) | 1.3 | 1.2 | 1.1 | 0.95 | 1.28 | 1.17 |
| Flow Activation energy (kJ/mol) | 32 | 32 | | | | |
| Molecular Weight Distribution | 3.8 | 3.8 | 3.9 | 3.8 | 3.9 | 3.7 |
| Melt Elastic Modulus G' (Pa) | 50 | 51 | 59 | 64 | 53 | 51 |

Methods of Test

Melt index (190/2.16) was measured according to ISO 1133.

Density was measured using a density column according to ISO 1872/1 method except that the melt index extrudates were annealed in boiling water for 30 minutes. It was then cooled down in the water without further heating for 60 minutes. 2 samples were taken, washed with isopropanol and put in the density gradient column. The density value of the sample that sunk deeper was taken after 20 minutes.

Gel Permeation Chromatography Analysis for Molecular Weight Distribution Determination Apparent molecular weight distribution and associated averages, uncorrected for long chain branching, were determined by Gel Permeation Chromatography using a Waters 150 CV, with 4 Waters HMW 6E columns and a differential refractometer detector. The solvent used was 1,2,4 Trichlorobenzene at 135° C., which is stabilised with BHT, of 0.2 g/liter concentration and filtered with a 0.45 μm Osmonics Inc. silver filter. Polymer solutions of 1.0 g/liter concentration were prepared at 160° C. for one hour with stirring only at the last 30 minutes. The nominal injection volume was set at 400 μl and the nominal flow rate was 1 ml/min.

end of the molecular weight curve, leading to a better reproducibility and repeatability in the extraction and calculation these parameters.

Dynamic Rheological Analysis

Rheological measurements are carried out on a dynamic rheometer (e.g., ARES) with 25 mm diameter parallel plates in a dynamic mode under an inert atmosphere. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

Measurement of Melt Elastic Modulus G' (G''−=500 Pa) at 190° C.:

The frequency sweep (FS) experiment is then carried out at 190° C. using the above appropriately selected strain level and the dynamic rheological data thus measured are then analysed using the rheometer software (viz., Rheometrics RHIOS V4.4 or Orchestrator Software) to determine the melt elastic modulus G' (G''=500 Pa) at a constant, reference value (500 Pa) of melt viscous modulus (G'').

Flow Activation Energy (Ea) Measurement

The bulk dynamic rheological properties (e.g., G', G'' and η*) of all the polymers were then measured at 170°, 190° and 210° C. At each temperature, scans were performed as a function of angular shear frequency (from 100 to 0.01 rad/s) at a constant shear strain appropriately determined by the above procedure.

The dynamic rheological data was then analysed using the Rheometrics Software. The following conditions were selected for the time-temperature (t-T) superposition and the determination of the flow activation energies ($E_a$) according to an Arrhenius equation, $a_T = \exp(E_a/kT)$, which relates the shift factor ($a_T$) to $E_a$:

Rheological Parameters: G'(ω), G''(ω) & η*(ω)
Reference Temperature: 190° C.
Shift Mode: 2D (i.e., horizontal & vertical shifts)
Shift Accuracy: High
Interpolation Mode: Spline

EXAMPLE 2

A number of the above copolymers from Example 1 were extruded into 25 μm thick blown films using the following conditions:
blown film extrusion line (CMG 1200TSA)
screw type 55 mm diameter, L/D=30
Die—150 mm diameter and 2.2 mm die gap
blow up ratio (BUR) of 2.5:1
melt temperature—216° C.
output: 50 kg/h
take off speed—30 m/min
frostline height—430 mm
Properties of the blown films are given in Table 2

TABLE 2

| Property | Ex. 2 | Ex. 3 | Ex. 4 | Ex. 5 | Ex. 6 |
|---|---|---|---|---|---|
| Haze (%) | 5.7 | 5.4 | 6.0 | 6.5 | 5.9 |
| Gloss 45° (%) | 69 | 72 | 76 | 71 | 70 |
| Dart Impact (g) | 2250 | 2375 | 1323 | 1367 | 1980 |

Dart impact was measured by ASTM D1709, haze by ASTM D1003. and gloss by ASTM D2457.

The invention claimed is:

1. A copolymer of ethylene and an alpha-olefin, said copolymer having
    (a) a density in the range 0.900-0.940 g/cm$^3$,
    (b) a molecular weight distribution (Mw/Mn) in the range 3.5 to 4.5,
    (c) a melt elastic modulus G' (G''=500 Pa) in the range 50 to 100 Pa,
    (d) an activation energy of flow (Ea) in the range 28-45 kJ/mol, and
    (e) a melt index (g/10 min) in the range 1.0-3.5.

2. A copolymer according to claim 1 wherein the melt elastic modulus G' (G''=500 Pa) in the range 55 to 100 Pa.

3. A copolymer according to claim 1 wherein the melt index (g/10 min) is in the range 1.2-1.6.

4. A copolymer according to claim 1 wherein the relationship between melt index and melt elastic modulus G' is according to the equation:

$$G'(G''=500\ Pa) > 58 - 8\ MI.$$

5. A copolymer according to claim 1 wherein the alpha-olefin has 4-12 carbon atoms.

6. A copolymer according to claim 5 wherein the alpha-olefin is 1-hexene.

7. A process for the preparation of copolymers as claimed in claim 1, said process comprising copolymerising ethylene and an alpha-olefin in the presence of a metallocene catalyst system.

8. A process according to claim 7 wherein the metallocene catalyst system comprises a monocyclopentadienyl metallocene complex having a 'constrained geometry' configuration.

9. A process according to claim 8 wherein the monocyclopentadienyl metallocene complex has the formula:

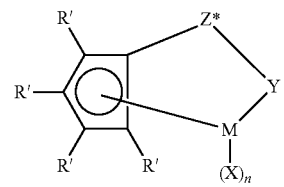

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is hydride or a moiety selected from the group consisting of halo, alkyl, aryl, aryloxy, alkoxy, alkoxyalkyl, amidoalkyl, siloxyalkyl having up to 20 non-hydrogen atoms and neutral Lewis base ligands having up to 20 non-hydrogen atoms,
Y is —O—, —S—, —NR*—, —PR*—,
M is hafnium, titanium or zirconium,
Z* is SiR*$_2$, CR*$_2$, SiR*$_2$SiR*$_2$, CR*$_2$CR*$_2$, CR*=CR*, CR*$_2$SiR*$_2$, or GeR*$_2$,
wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system,
and n is 1 or 2 depending on the valence of M.

10. A process according to claim 7 performed in the gas or slurry phase.

11. A film comprising a copolymer as claimed in claim 1.

12. A film having a dart impact (25 μm film) >1000g, a haze <10% and a gloss of >65%, said film comprising a copolymer of ethylene and an alpha-olefin having (a) a density in the range 0.900-0.940 g/cm$^3$, (b) a molecular weight distribution (Mw/Mn) in the range 3.5 to 4.5, (c) a melt elastic modulus G' (G"=500 Pa) in the range 40 to 150 Pa, (d) an activation energy of flow (Ea) in the range 28-45 kJ/mol, and (e) a melt index (g/10 min) in the range 1.0-3.5.

13. A film according to claim 11 wherein the film is a blown film.

* * * * *